(12) United States Patent
Millane et al.

(10) Patent No.: US 11,852,285 B2
(45) Date of Patent: Dec. 26, 2023

(54) STAND FOR LASER PROJECTION TOOL

(71) Applicant: Milwaukee Electric Tool Corporation, Brookfield, WI (US)

(72) Inventors: Christopher R. Millane, Menomonee Falls, WI (US); Seth A. Rueter, Monona, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/047,444

(22) Filed: Oct. 18, 2022

(65) Prior Publication Data

US 2023/0067348 A1    Mar. 2, 2023

Related U.S. Application Data

(63) Continuation of application No. 17/212,770, filed on Mar. 25, 2021, now Pat. No. 11,480,289, which is a continuation of application No. PCT/US2021/023929, filed on Mar. 24, 2021.

(60) Provisional application No. 63/004,906, filed on Apr. 3, 2020.

(51) Int. Cl.
*F16M 11/00* (2006.01)
*F16M 11/24* (2006.01)
*G01C 15/00* (2006.01)

(52) U.S. Cl.
CPC ......... *F16M 11/245* (2013.01); *G01C 15/004* (2013.01); *F16M 2200/068* (2013.01)

(58) Field of Classification Search
None
See application file for complete search history.

(56) References Cited

U.S. PATENT DOCUMENTS

| 1,238,015 | A | * | 8/1917 | Henderson | F16M 11/00 |
| | | | | | 248/188.91 |
| 2,323,473 | A | * | 7/1943 | Korling | F16M 11/2014 |
| | | | | | 248/183.1 |
| 4,824,020 | A | | 4/1989 | Harward | |
| 5,012,585 | A | | 5/1991 | DiMaggio | |
| 5,690,418 | A | | 11/1997 | Hsiung | |

(Continued)

FOREIGN PATENT DOCUMENTS

| JP | 2007-163281 | 6/2007 |
| KR | 10-1025390 | 3/2011 |

(Continued)

OTHER PUBLICATIONS

Stabila LAR250 Laser Video, https://www.youtube.com/watch?v=tjQjjjZWMkk&t=639s, believed to be available at least as early as Nov. 16, 2010.

(Continued)

*Primary Examiner* — Steven M Marsh
(74) *Attorney, Agent, or Firm* — Reinhart Boerner Van Deuren s.c.

(57) ABSTRACT

A stand for a laser projection device is provided. The stand includes a mounting structure that couples to the laser projection device. In one embodiment the stand includes three legs that are coupled together at a junction, and a central column extends downward from the junction and the mounting structure is coupled to the mounting structure, thereby permitting the laser projection device to emit light towards a ground.

19 Claims, 9 Drawing Sheets

(56) References Cited

U.S. PATENT DOCUMENTS

| | | | |
|---|---|---|---|
| 5,754,582 A | 5/1998 | Dong | |
| 6,128,326 A | 10/2000 | Kousek et al. | |
| 6,322,027 B1* | 11/2001 | Hsu | F16M 11/34 |
| | | | 248/188.7 |
| 6,762,830 B1 | 7/2004 | Connolly | |
| 7,011,280 B2 | 3/2006 | Murray et al. | |
| 7,116,697 B1 | 10/2006 | Dong | |
| 7,207,118 B2 | 4/2007 | Watters et al. | |
| 7,441,339 B2 | 10/2008 | Kallabis | |
| 7,604,208 B2 | 10/2009 | Tacklind | |
| 7,669,814 B2 | 3/2010 | Bogel | |
| 7,737,352 B2* | 6/2010 | Chang | G10D 13/065 |
| | | | 248/188.7 |
| 7,997,753 B2 | 8/2011 | Walesa et al. | |
| 10,065,059 B2 | 9/2018 | Thomsen | |
| 10,514,278 B1* | 12/2019 | Becker | G01D 11/30 |
| 10,907,809 B2* | 2/2021 | Harvey | F21V 17/007 |
| 11,036,115 B2* | 6/2021 | Li | F16M 11/2071 |
| 2005/0121590 A1* | 6/2005 | Vanover | F16M 11/16 |
| | | | 248/170 |
| 2011/0315834 A1 | 12/2011 | Lukic et al. | |

FOREIGN PATENT DOCUMENTS

| | | |
|---|---|---|
| KR | 10-1619402 | 5/2016 |
| WO | WO2005/090911 | 9/2005 |
| WO | WO10030083 | 3/2010 |
| WO | WO16140491 | 9/2016 |

OTHER PUBLICATIONS

International Search Report and Written Opinion for International Application No. PCT/US2021/023929, dated Jul. 13, 2021, 10 pages.

* cited by examiner

STAND FOR LASER PROJECTION TOOL

CROSS-REFERENCE TO RELATED PATENT APPLICATIONS

The present application is a continuation of U.S. application Ser. No. 17/212,770, filed Mar. 25, 2021, which is a continuation of International Application No. PCT/US2021/023929, filed on Mar. 24, 2021, which claims the benefit of and priority to U.S. Provisional Application No. 63/004,906, filed on Apr. 3, 2020, each of which are incorporated herein by reference in their entireties.

BACKGROUND OF THE INVENTION

The present invention relates generally to the field of tools. The present invention relates specifically to a stand for a laser projection device, such as three-plane laser level, a cross-line laser level, a point laser level, etc., which projects one or more lasers onto a work piece or work surface.

SUMMARY OF THE INVENTION

One embodiment of the invention relates to a support structure for a laser level including a central axis, a plurality of legs pivotally coupled together and arranged around the central axis, a plurality of support arms, and a frame. Each of the plurality of support arms are pivotally coupled to at least one of the plurality of legs. The frame is coupled to the plurality of support arms, the central axis intersects the frame, and the frame is configured to be coupled to a laser level.

Another embodiment of the invention relates to a support structure for a laser level including a platform defining an upper end of the support structure, three legs pivotally coupled to and extending downward from the platform, a central axis intersecting the platform and surrounded by the three legs, a central arm coupled to the platform and extending downward along the central axis, and a frame. The frame is coupled to the central arm. The frame includes a laser level coupling positioned to support the laser level below the frame and surrounded by the three legs.

Another embodiment of the invention relates to a laser level assembly including a laser level stand and a laser level. The laser level stand includes a plurality of legs pivotally coupled together, a platform pivotally coupled to the plurality of legs, and a frame coupled to the plurality of legs. The platform defines an upper end of the laser level stand. The laser level is coupled to the frame and includes a top surface that faces upwards towards the platform.

According to a first embodiment, a stand for a laser projection device includes a plurality of legs coupled together, an arm coupled to the legs, and a frame coupled to the arm. An upper end of the arm is coupled to at least one of the legs, and the arm extends downward from the upper end. A laser projection device coupled to the frame.

In a specific embodiment, a frame is coupled to a lower end of the arm opposite the upper end, and the laser projection device is coupled to the arm via being coupled to the frame, which is coupled to the arm. In a specific embodiment, the laser projection device can be repositioned and recoupled to the frame such that the laser projection device rotates with respect to the stand about a rotational axis. In a specific embodiment, the support is centered around the rotational axis.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Referring generally to the figures, various embodiments of a stand for a laser projection device, such as three-plane laser level, a cross-line laser level, a point laser level, are shown. In general, housing for the laser projection tool is coupled to a stand. In one embodiment, the stand is a tripod, and the laser projection tool is mounted at the bottom of a central column extending downward below the tripod.

In contrast to the stand for a laser projection device discussed herein, conventional mounting accessories are cumbersome and/or are not mountable at lower heights relative to the stand. The laser projection device and compact frame discussed herein provides a design that addresses these deficiencies of conventional devices while still providing fine adjustment and mounting functionality, along with the compact size discussed herein.

Figure 1:
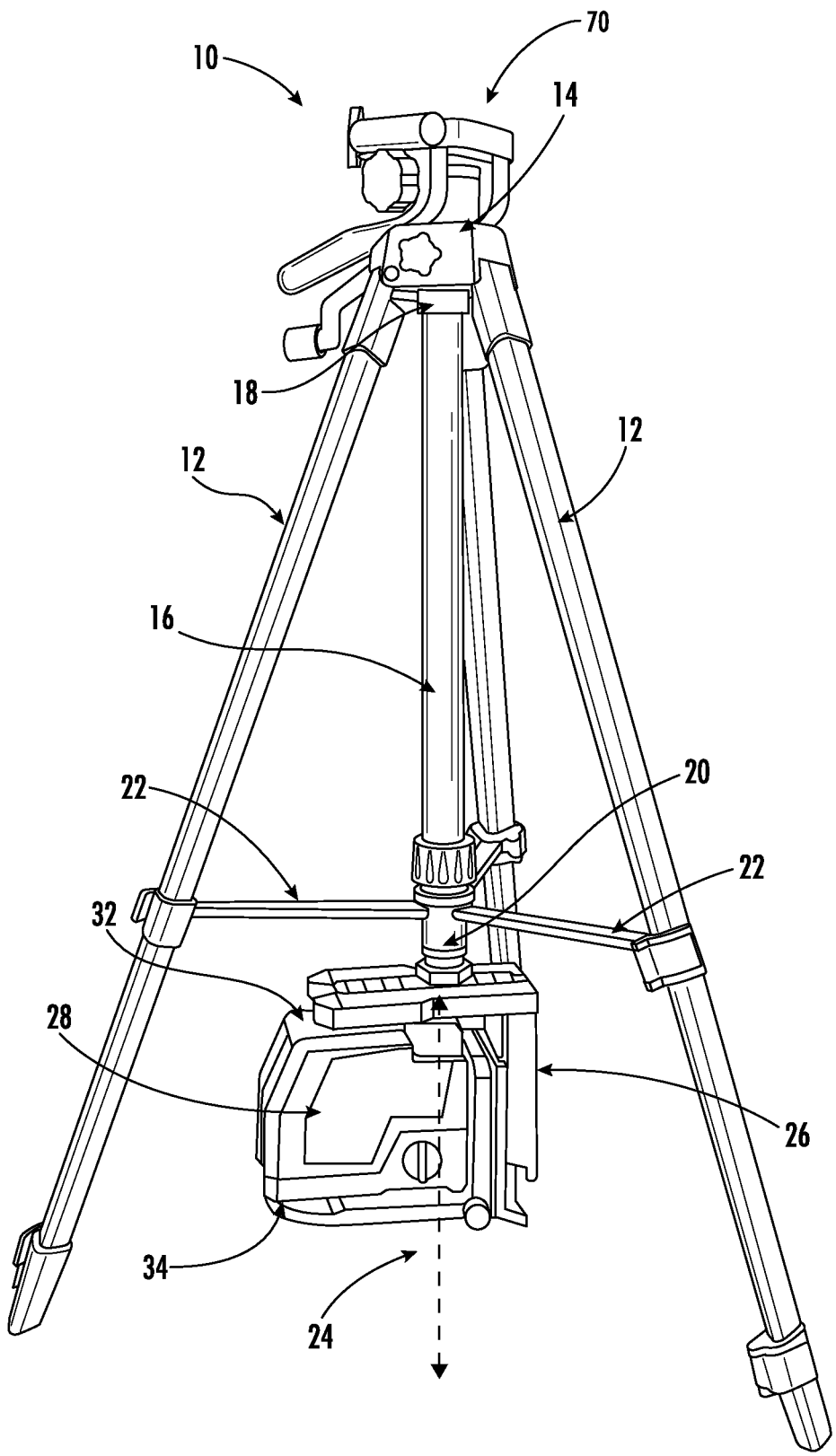
FIG. 1 is a perspective view of a stand, according to an exemplary embodiment.
Figure 2:
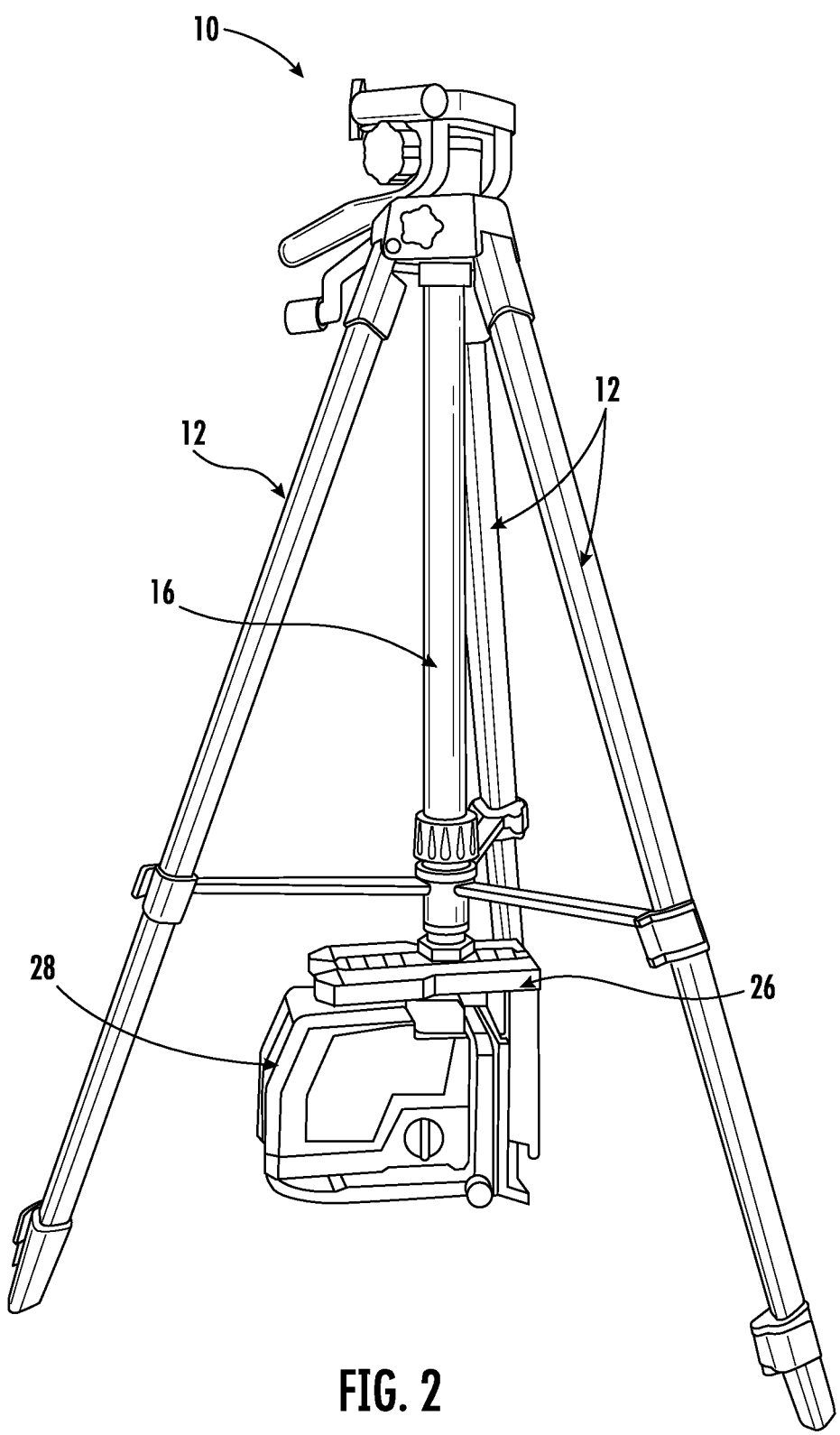
FIG. 2 is a perspective view of the stand of FIG. 1.
Figure 3:
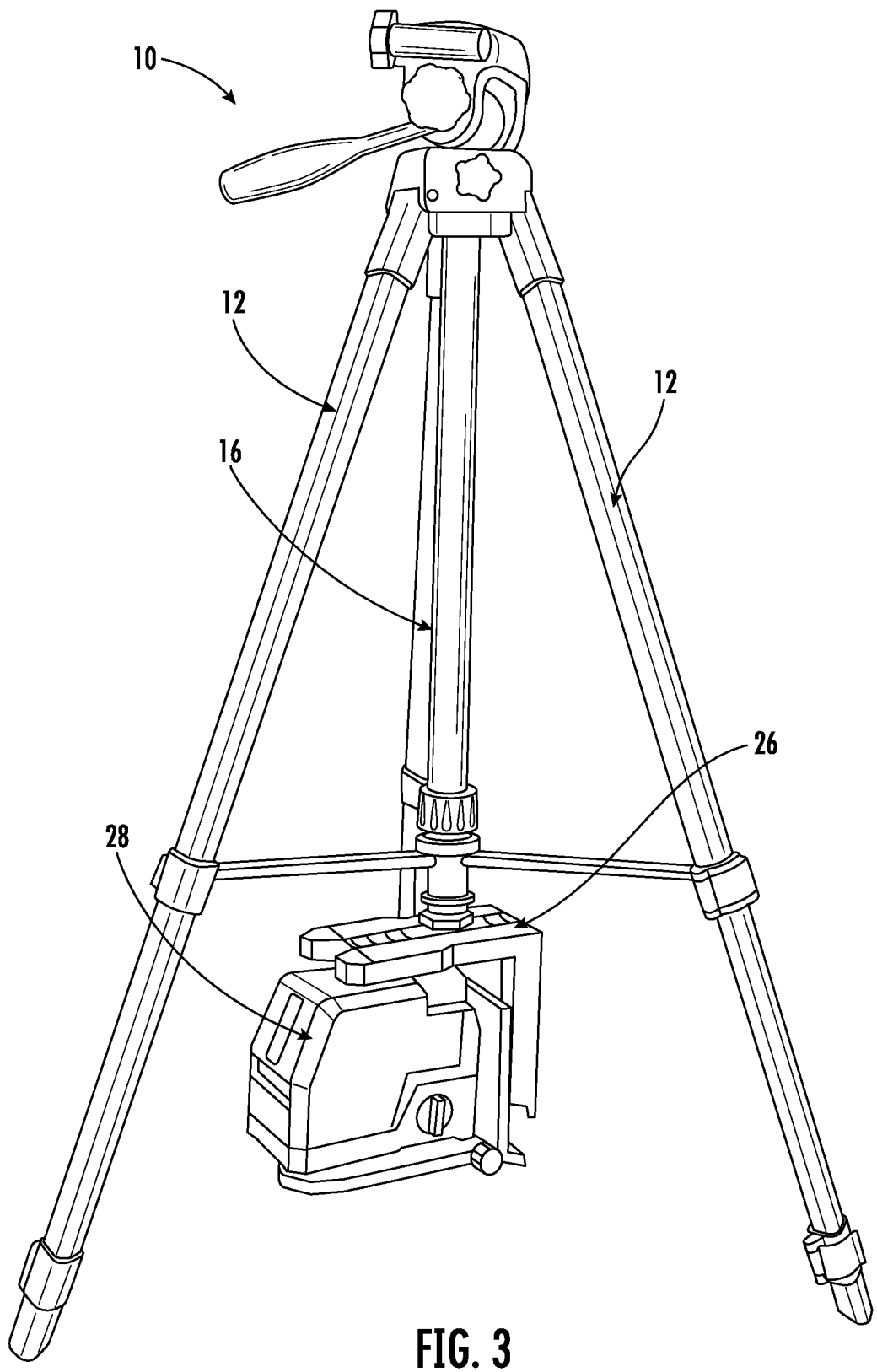
FIG. 3 is a schematic view of the stand of FIG. 1.
Figure 4:
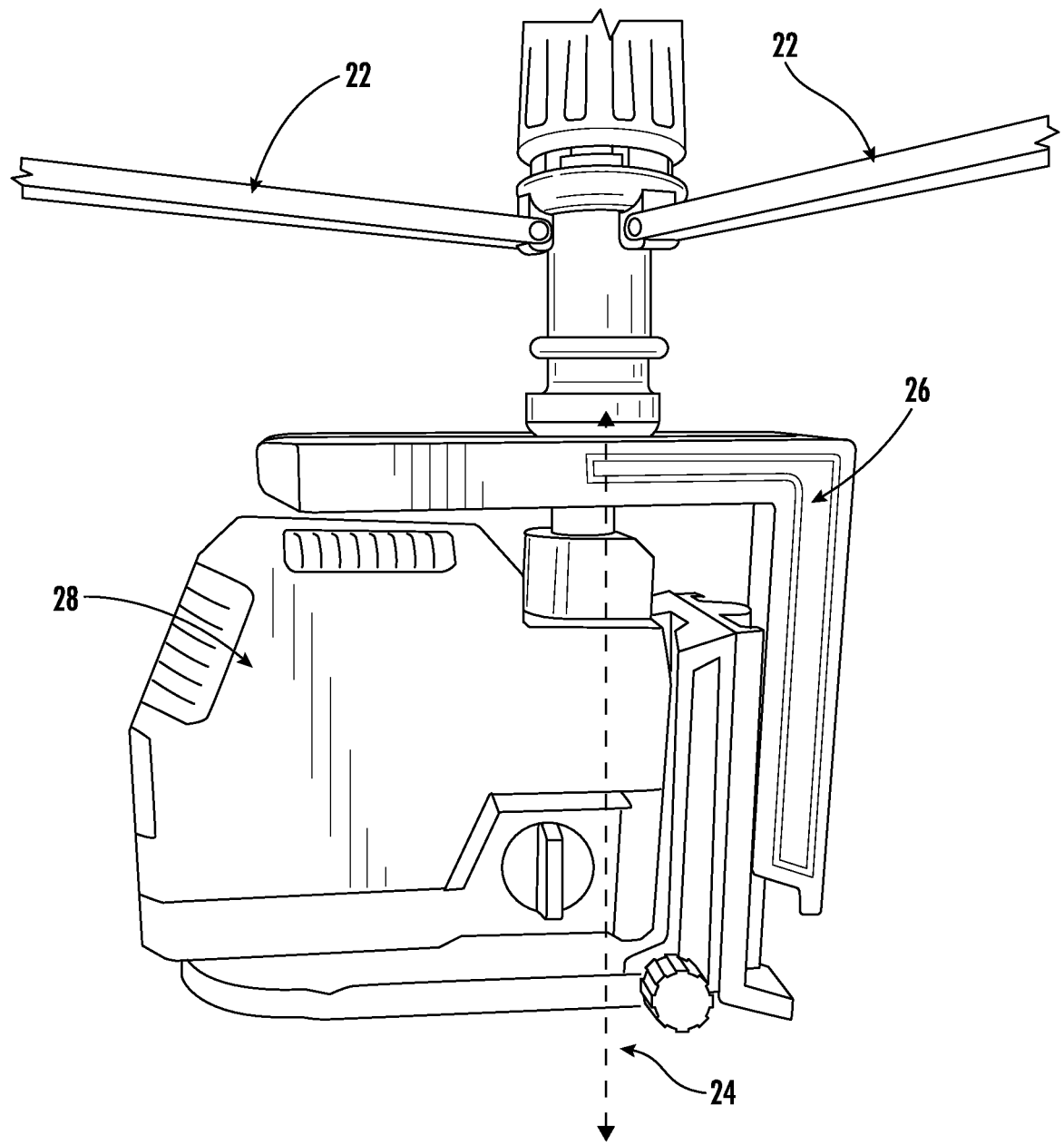
FIG. 4 is a perspective view of the stand of FIG. 1.
Figure 5:
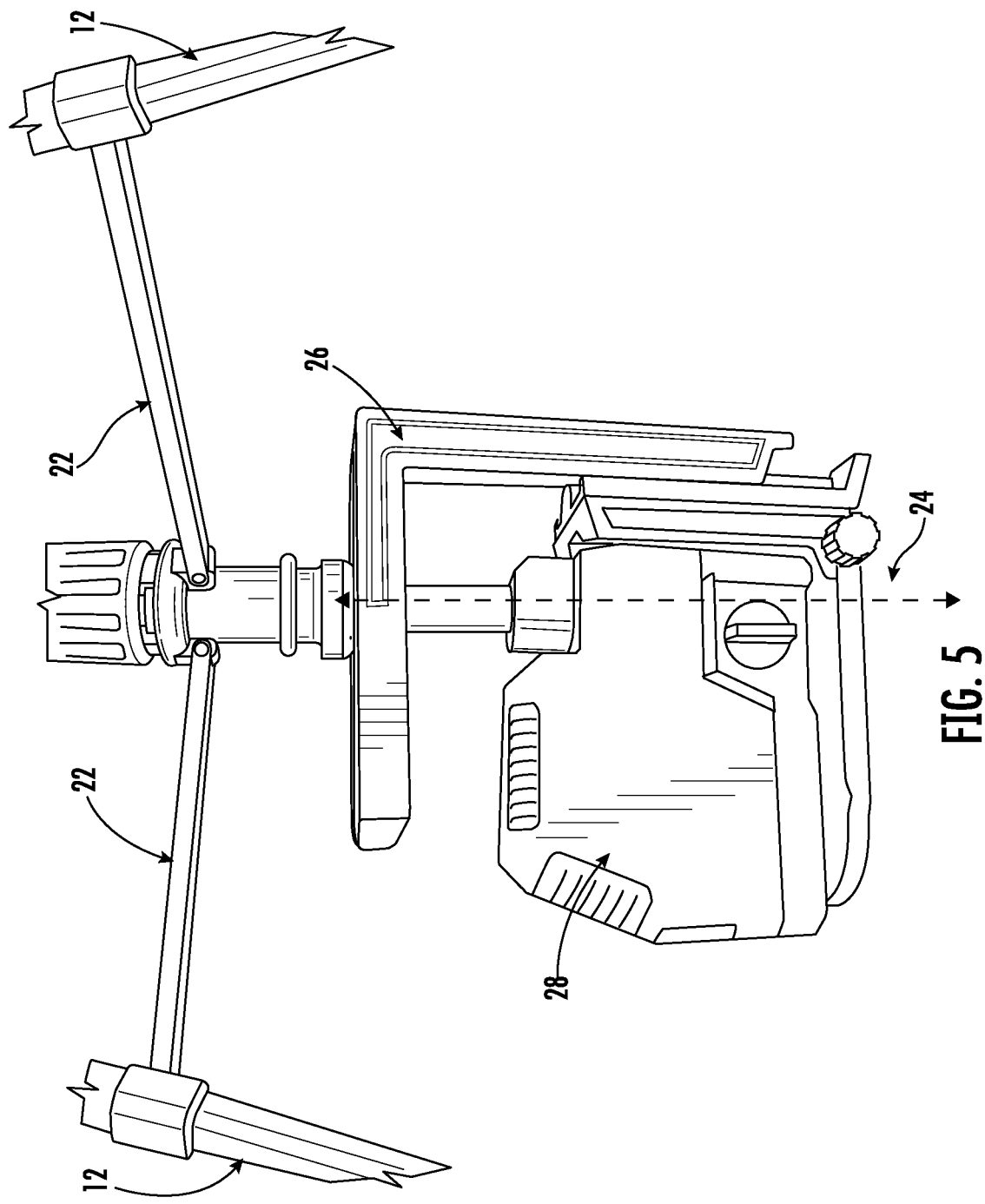
FIG. 5 is a perspective view of the stand of FIG. 1.
Figure 6:
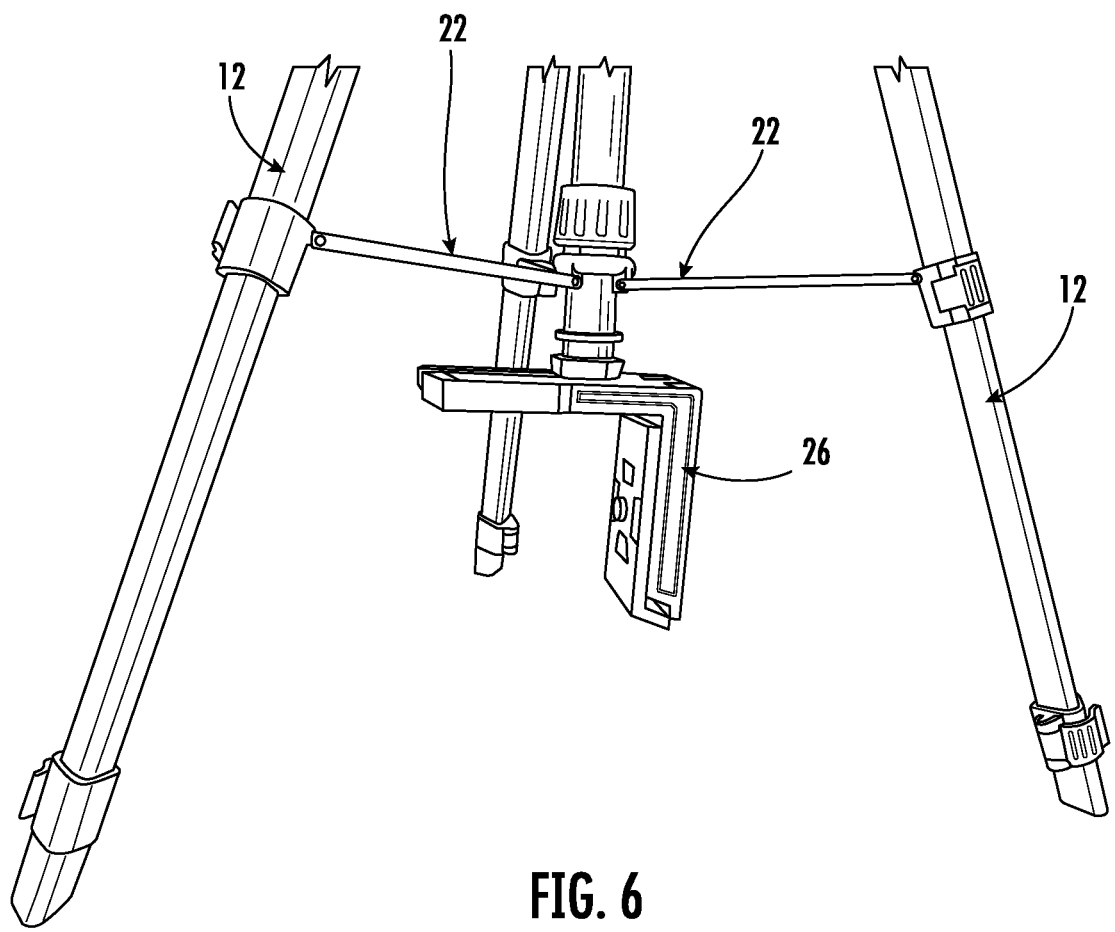
FIG. 6 is several schematic views of the stand of FIG. 1.
Figure 7:
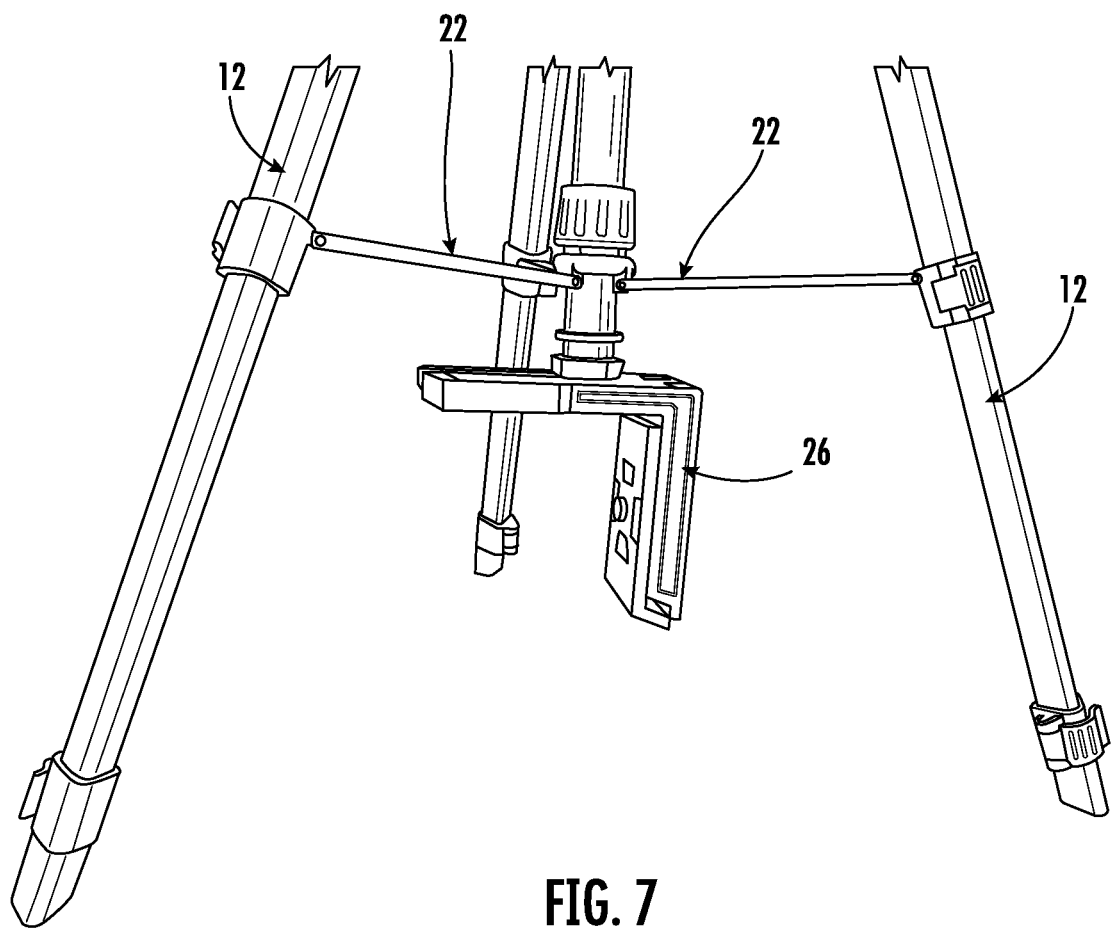
FIG. 7 is several schematic views of the stand of FIG. 1.

Referring to FIGS. 1-3, a movable structure, assembly, or stand, shown as tripod 10, is shown according to an exemplary embodiment. In a specific embodiment, tripod 10 is a laser level assembly and/or a laser level stand. In use, a plurality of legs 12 of tripod 10 are pivotally coupled together, such as at platform 14, and extend downward from platform 14. In a specific embodiment, central axis 24 intersects platform 14. In a specific embodiment tripod 10 includes three legs 12. In a specific embodiment, legs 12 are arranged around central axis 24, and more specifically legs 12 are arranged symmetrically around central axis 24 with respect to each other, such as legs 12 being rotationally symmetrical with respect to each other around central axis 24. Tools, such as laser projection tools, are coupled to platform 14 (e.g., above platform 14) to facilitate marking and/or measuring locations. In a specific embodiment, platform 14 defines an upper end 70 of tripod 10.

Central arm 16 is coupled to legs 12 and extends downward from platform 14 and/or downward from legs 12.

Upper end 18 of central arm 16 is coupled to platform 14. In a specific embodiment, central arm 16 extends along central axis 24 (e.g., parallel or approximately to parallel to central axis 24). In a specific embodiment, central arm 16 extends downwards from platform 14 parallel to central axis 24. In a specific embodiment, central arm 16 intersects central axis 24.

Central arm 16 is further supported by support arms 22, such as three support arms 22. In a specific embodiment, each of a plurality of support arms 22 are coupled to central arm 16, such as pivotally coupled. In a specific embodiment, each of a plurality of support arms 22 are coupled to at least one of the plurality legs 12, such as pivotally coupled to at least one of the plurality legs 12. In a specific embodiment, the plurality of support arms 22 are slideably coupled to central arm 16. In a specific embodiment, each of the plurality of support arms 22 extends inwardly towards central axis 24 from the at least one of the plurality of legs 12 the support arm 22 is coupled to, such as extending inwardly towards central axis 24 from the at least one of the plurality of legs 12 the support arm 22 is coupled to.

Frame 26 is coupled to lower end 20 of central arm 16, which is opposite upper end 18 of arm 16. Frame 26 is configured to be coupled to a laser projection tool 28 such that the laser projection tool 28 is below frame 26 and surrounded by legs 12. In a specific embodiment, frame 26 is the same or similar as one or more of the frames in PCT App. No. PCT/US20/13877, which is hereby incorporated in its entirety. In a specific embodiment, frame 26 is coupled to the plurality of support arms 22, such as being pivotally coupled. In a specific embodiment, frame 26 is coupled to central arm 16, such as being pivotally coupled. In a specific embodiment, central axis 24 intersects with frame 26. In a specific embodiment, frame 26 rotates with respect to legs 12 around central axis 24. In a specific embodiment, frame 26 rotates with respect to support arms 22 around central axis 24.

Laser projection tool 28 can be repositioned with respect to tripod 10 such that laser projection tool 28 is effectively rotated about axis 24. In various configurations, top surface 32 of laser projection tool 28 faces upwards towards platform 14 and bottom 34 of laser projection tool 28 faces downward to the ground. This configuration permits laser projection tool 28 to simultaneously emit a light laterally towards a wall and downwards towards the ground, thus allowing laser projection tool 28 to be aligned relative to a point on the wall and/or a point on the ground.

Turning to FIGS. 4-7, laser projection tool 28 can be repositioned with respect to frame 26. In a specific embodiment, repositioning laser projection tool 28 effectively involves rotating laser projection tool 28 about axis 24 with respect to tripod 10.

Figure 8:
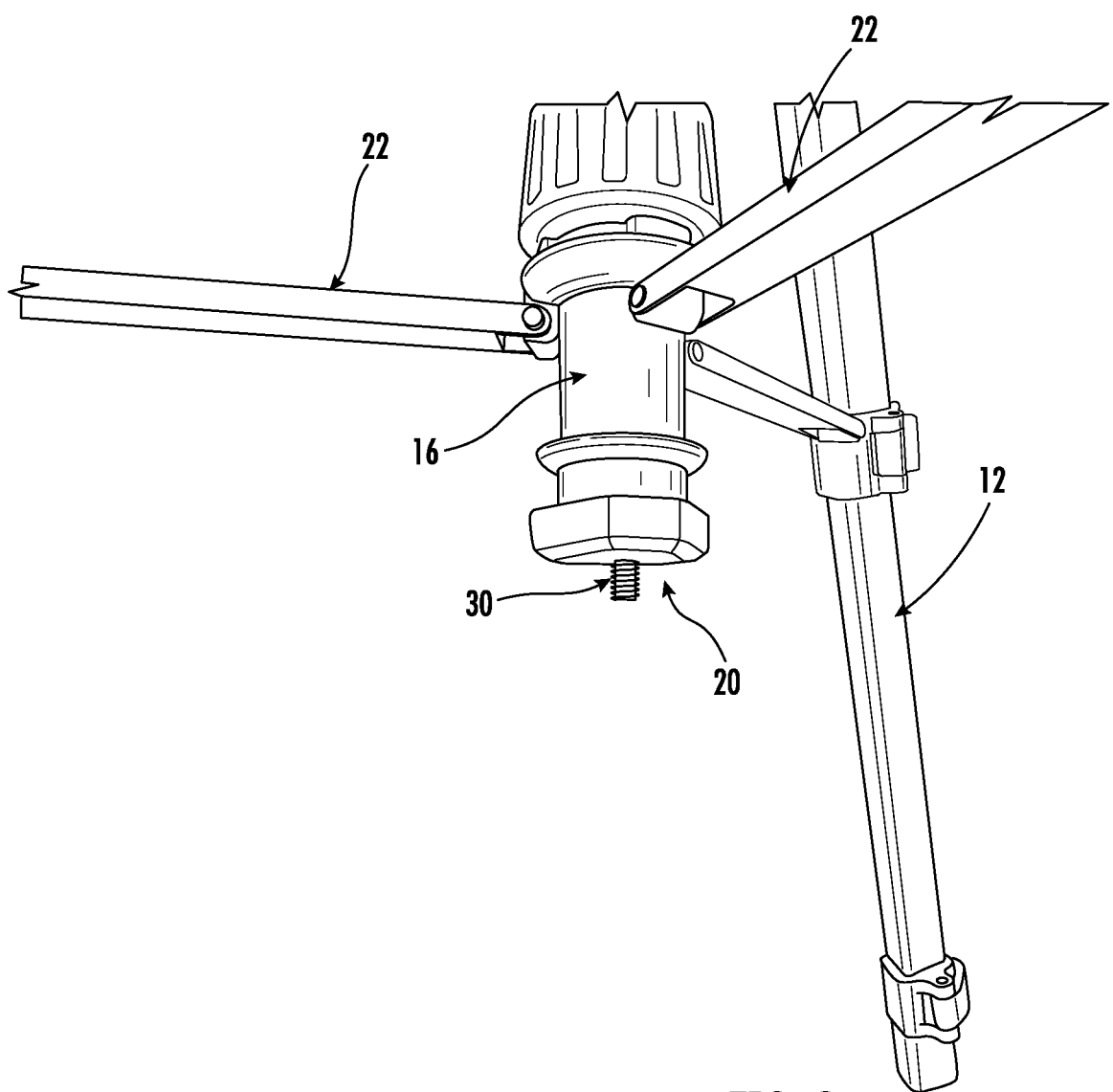
FIG. 8 is several schematic views of the stand of FIG. 1.
Figure 9:
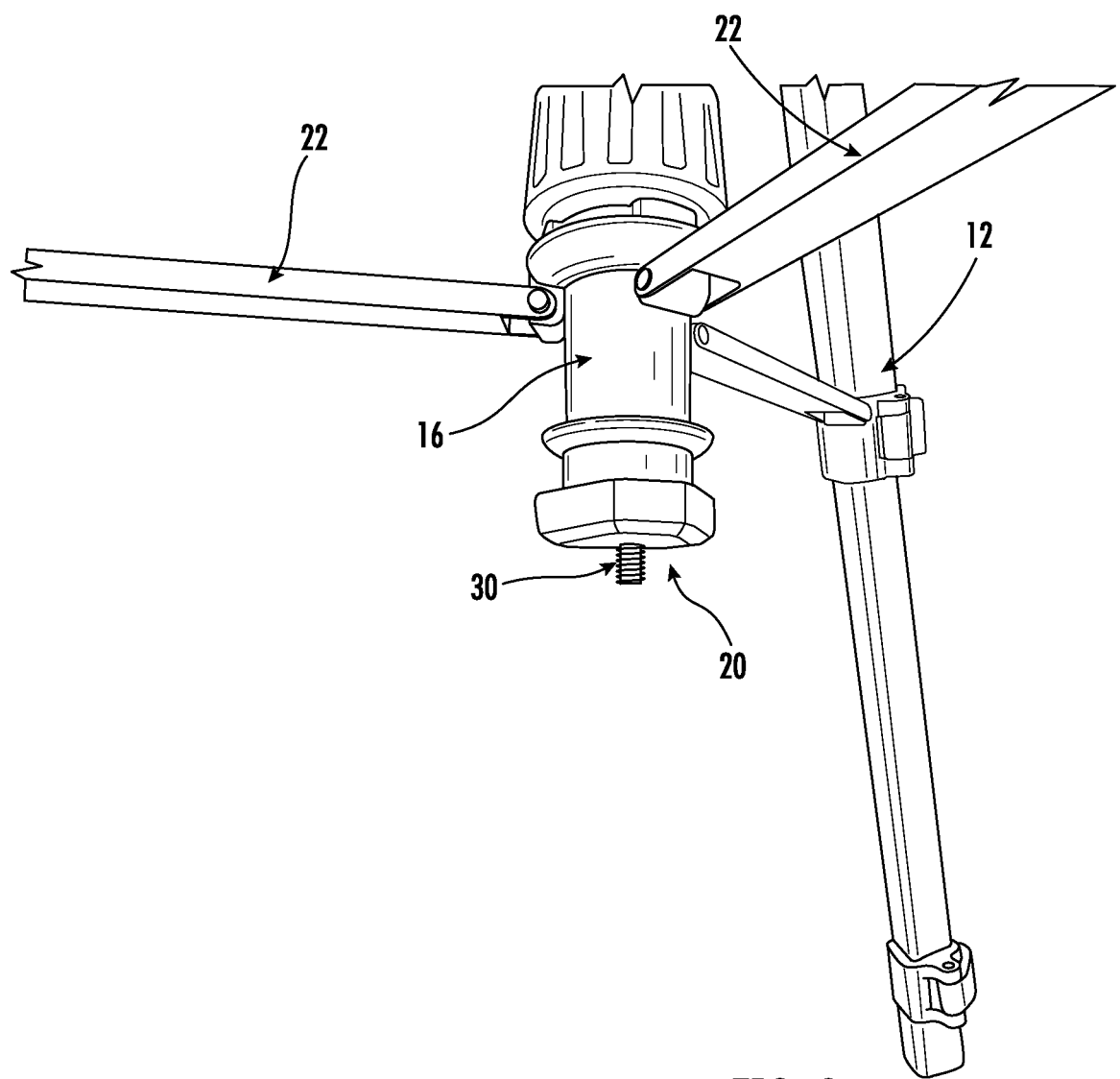
FIG. 9 is several schematic views of the stand of FIG. 1.

Turning to FIGS. 8-9, in a specific embodiment, frame 26 is coupled to arm 16 via a coupling component, shown as screw 30.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A support structure for a laser level comprising:
   a plurality of legs pivotally coupled together;
   a central axis, the plurality of legs arranged around the central axis;
   a plurality of support arms, each of which is pivotally coupled to at least one of the plurality of legs; and
   a frame coupled to the plurality of support arms, the central axis intersecting the frame, the frame comprising a first arm extending vertically, the first arm of the frame configured to detachably couple to a laser level and a second arm extending horizontally from the first arm, the first arm extending vertically from the second arm, the second arm of the frame configured to detachably couple to the laser level.

2. The support structure of claim 1, comprising a central arm coupled to the frame, wherein the frame rotates with respect to the plurality of legs around the central axis.

3. The support structure of claim 1, comprising a central arm coupled to the frame, wherein each of the plurality of support arms is pivotally coupled to the central arm.

4. The support structure of claim 3, wherein each of the plurality of support arms is pivotally coupled to at least one of the plurality of legs.

5. The support structure of claim 4, comprising a platform coupled to the plurality of legs, the platform defining an upper end of the laser level stand, wherein the central arm extends downward from the platform such that the frame is below the platform.

6. The support structure of claim 3, comprising a platform pivotally coupled to the plurality of legs, the platform defining an upper end of the laser level stand, wherein the central arm extends downward from the platform.

7. The support structure of claim 1, wherein the plurality of legs are arranged around the central axis rotationally symmetrical with respect to each other.

8. The support structure of claim 7, the plurality of legs comprising at least three legs.

9. A support structure for a laser level comprising:
   a plurality of legs pivotally coupled together;
   a central axis, the plurality of legs arranged around the central axis; and
   a frame coupled to the plurality of legs, the central axis intersecting the frame, the frame comprising a first arm extending vertically and a second arm coupled to the first arm and extending horizontally, the first arm and the second arm of the frame configured to detachably couple to a laser level.

10. The support structure of claim 9, comprising a central arm coupled to the frame and extending along the central axis, wherein the frame rotates with respect to the plurality of legs around the central axis.

11. The support structure of claim 10, wherein the central arm is coupled to the plurality of legs.

12. The support structure of claim 11, comprising a platform pivotally coupled to the plurality of legs, the platform defining an upper end of the laser level stand, wherein the central arm extends downward from the platform such that the frame is below the platform.

13. The support structure of claim 9, wherein the plurality of legs are arranged around the central axis rotationally symmetrical with respect to each other.

14. The support structure of claim 9, the first arm extending vertically from the second arm, and the second arm extending horizontally from the first arm.

15. A laser level assembly comprising:
   a laser level stand comprising:
      a plurality of legs pivotally coupled together at an upper end of the laser level stand; and
      a frame coupled to the plurality of legs; and
   a laser level detachably coupled to the frame, the laser level comprising a top surface that faces upwards towards the upper end of the laser level stand, the laser level configured to simultaneously emit light laterally towards a wall and downwards towards the ground.

16. The laser level assembly of claim 15, the frame comprising a first arm extending vertically, the first arm configured to detachably couple to the laser level.

17. The laser level assembly of claim 16, the frame comprising a second arm extending horizontally, the second arm configured to detachably couple to the laser level.

18. The laser level assembly of claim 15, comprising:
   a platform coupled to the plurality of legs, the platform defining the upper end of the laser level stand;
   a central axis, the plurality of legs arranged around the central axis; and
   a central arm extending downward from the platform along the central axis and coupled to the frame, wherein the frame rotates with respect to the plurality of legs around the central axis.

19. The laser level assembly of claim 18, wherein the central axis intersects the frame.

* * * * *